Feb. 15, 1927.

E. N. LIGHTFOOT 1,617,489

ELECTRICALLY HEATED DEVICE AND METHOD OF MANUFACTURE THEREOF

Filed June 2, 1922

INVENTOR.
Edwin N. Lightfoot
BY
ATTORNEY.

Patented Feb. 15, 1927.

1,617,489

UNITED STATES PATENT OFFICE.

EDWIN N. LIGHTFOOT, OF NEW YORK, N. Y., ASSIGNOR TO THE CUTLER-HAMMER MFG. CO., OF MILWAUKEE, WISCONSIN, A CORPORATION OF WISCONSIN.

ELECTRICALLY-HEATED DEVICE AND METHOD OF MANUFACTURE THEREOF.

Application filed June 2, 1922. Serial No. 565,330.

This invention relates to electrically heated devices and a method of manufacture thereof.

In practice there are instances where it is desired to electrically heat elements which are available as standard articles of manufacture, or which by reason of the material employed therefor or the required accuracy of construction thereof or for other reasons are preferably if not necessaily formed separately from the completed devices in which they are incorporated. However, as is well known, it has been found exceedingly difficult to mechanically combine such separately formed elements with their heating elements in an efficient thermal relation, and the present invention has among its objects to overcome such difficulties.

More specifically the invention has among its objects to provide an integral electrically heated device comprising separately formed heated and heating elements so united as to provide a strong permanent bond therebetween by virtue of which said elements are insured an excellent thermal relationship.

Another object is to provide a method of manufacture whereby such a device may be readily formed without requiring contact between the heating and heated elements thereof to obtain the desired transfer of heat therebetween, but enabling the heating element or elements to be placed in direct contact with the heated element for convenience in manufacture if desired.

Another object is to provide a method of manufacture applicable to various types of heated and heating elements of standard and special construction.

Various other objects and advantages of the invention will hereinafter appear.

According to the present invention it is proposed to place the heated element and its heating element or elements after temporary securement thereof in the desired relation within a mold and then pour molten metal into the mold to form a cast band about the heated and heating elements to mechanically bond the same and to exert thereon a compression force upon cooling, the relative temperatures of the parts being controlled if desired to regulate such compression force.

Certain embodiments of the invention are illustrated in the accompanying drawing and the same will now be described, it being understood that the invention is susceptible of embodiment in other forms without departing from the scope of the appended claims.

In the drawing which is more or less diagrammatic,

Figure 1:
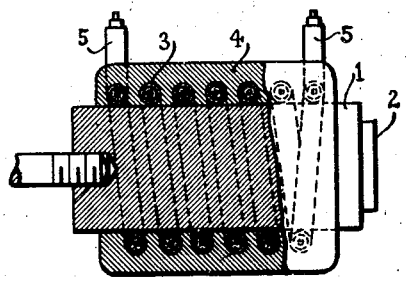
Figures 1 and 2 show an electrically heated branding iron.
Figure 2:
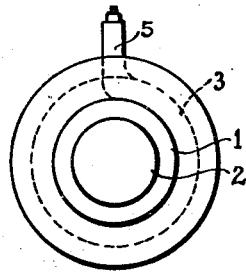

Referring to Figs. 1 and 2 the branding iron comprises a cylindrical core section 1 to which is fixed a die 2 and about which is coiled a heating element 3. The heating element 3 which may be of any suitable type but preferably of the type disclosed in my Patent No. 1,359,400, granted November 16, 1920, is enclosed in a metal shell 4 cast onto and surrounding the core 1, said heating element having terminals 5 extending through the shell. The type of heating element specifically aforementioned comprises a helical resistor enclosed in a tubular metal jacket from which it is thoroughly insulated.

The core 1 which is of any preferred metal and formed in any preferred manner is initially wrapped with the heating element 3, the latter being preferably although not necessarily in direct contact with the former. When so assembled the core and heating element are placed in a mold being retained in the desired relation either by frictional engagement thereof or by temporary securing means after which molten iron, brass, bronze, aluminum or other preferred metal is poured into the mold to form the shell 4, such molten metal completely surrounding the coils of the heating element and contacting with the core. Thereupon the molten metal is allowed to cool with consequent shrinkage or contraction which causes it to exert a compression force upon the core 1.

Thus the shell is caused to tightly grasp the core to mechanically secure the former and the embedded heating element to the core even assuming the latter to be provided with a fairly smooth surface. Also the intimate contact thus produced between the shell and core affords excellent heat conduction between the heating element and core through the shell thus rendering contact of the heating element and core unnecessary. As will be understood the core or heating element or both may be heated during casting of the shell, the temperatures being controlled as desired to regulate the compression force of the shell on the core upon cooling.

Figure 3:
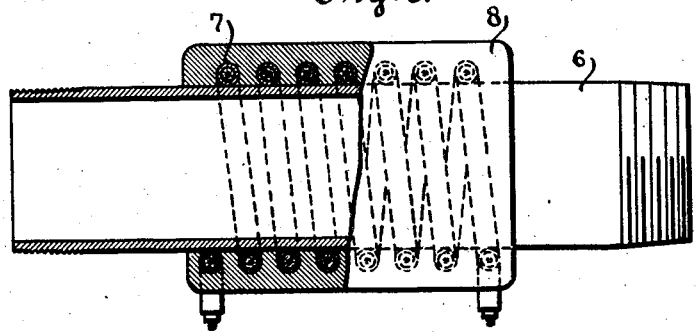
Fig. 3 shows an electrically heated pipe section.

Referring to Fig. 3 the same shows a pipe section 6 having a similar heating element 7 coiled thereabout and encased in a similar shell 8 cast onto and about the pipe section 6. This device may also be formed as above described.

Figure 4:
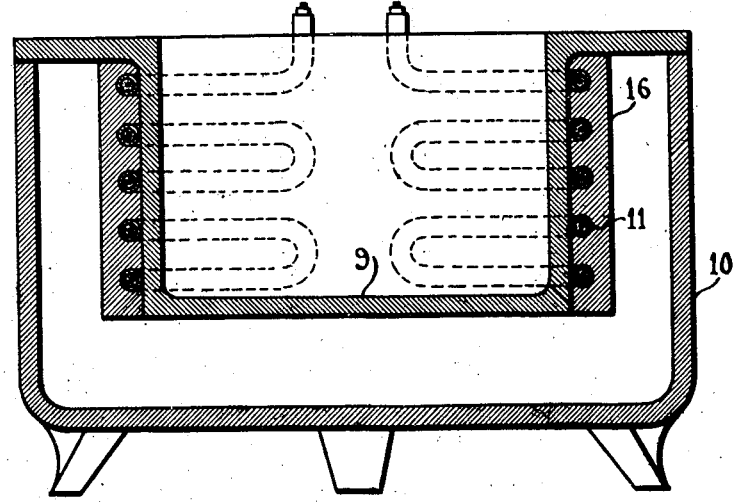
Fig. 4 shows an electrically heated crucible.

Referring to Fig. 4 the same shows a crucible 9 to be formed of drawn steel or cast iron and to be supported in a casing 10 from which the same is removable. The crucible which ordinarily must be formed with special care and hence formed separately has a heating element 11 coiled about its cylindrical section. In this instance the heating element preferably of the type aforementioned is reflexed and has its reflexed portions bent to surround the crucible instead of having each turn thereof completely surrounding the element to be heated as in the devices above described. However, as will be understood the heating element might be arranged on the crucible in the manner above described or in any other preferred manner whereby the same may be encased in a shell 16 cast onto and surrounding the crucible. As will be understood the shell 16 may be cast onto the crucible as above described the heating element being retained on the crucible by any preferred means during the casting operation.

In the manufacture of such crucibles it has been found that in some instances the shirnkage of the shell is so great as to cause cracking thereof unless the crucibles are preheated, which may be readily accomplished by pouring molten metal into the crucibles. A convenient method is to use a sufficiently large ladle to supply both the crucible and the mold, the crucible being supplied before the metal is poured into the mold. This raises the temperature of the crucible wall to a high degree but the maximum temperature thus obtained is lower than the temperature of the metal poured into the mold and consequently the shell will shrink more than the crucible wall to exert a compression force upon the wall but to a degree insufficient to cause it to crack.

What I claim as new and desire to secure by Letters Patent is:

1. An electrically heated device comprising an element to be heated, a heating element therefor and a cast metal shell containing said heating element and surrounding said element to be heated, said shell being contracted on the latter element to permanently subject the same to a compression force.

2. An electrically heated device comprising an element to be heated, a metal shell cast around and contracted on said element for intimate contact and firm engagement therewith and a heating element for the former element cast in said shell.

3. An electrically heated device comprising an element to be heated, a heating element therefor having a metal jacket and a metal shell cast upon and surrounding both of said elements, said shell being contracted on said elements to tightly bond the same in an efficient thermal relationship.

4. An electrically heated device comprising an element to be heated, an elongated heating element having a metal jacket and being distributed over a surface of said element to be heated and a metal shell cast around said elements and contracted to effect intimate contact with the element to be heated and secure bonding of said elements.

5. The method of forming an electrically heated device employing separately formed heated and heating elements which comprises casting on and about both elements a metal shell and shrinking such shell on the element to be heated to subject the latter to a compression force.

6. The method of forming an electrically heated device employing separately formed heated and heating elements which comprises casting on and about both elements a metal shell and controlling the relative temperature values to effect predetermined shrinkage of such shell on the element to be heated to subject the latter to a compression force.

7. The method of forming an electrically heated device employing separately formed heated and heating elements which comprises effecting temporary securement of such elements to one another, placing the same in a mold, pouring molten metal into such mold to form a shell surrounding both elements and cooling to effect contraction of the shell on the element to be heated for intimate contact and firm engagement therewith.

In witness whereof, I have hereunto subscribed my name.

EDWIN N. LIGHTFOOT.